United States Patent
Zhou et al.

(10) Patent No.: US 12,068,894 B2
(45) Date of Patent: Aug. 20, 2024

(54) WIRELESS DEVICES WITH PRIVACY MODULATION CODING

(71) Applicant: Apple Inc., Cupertino, CA (US)

(72) Inventors: Zhou Zhou, San Diego, CA (US); Sharad Sambhwani, San Diego, CA (US)

(73) Assignee: Apple Inc., Cupertino, CA (US)

( * ) Notice: Subject to any disclaimer, the term of this patent is extended or adjusted under 35 U.S.C. 154(b) by 65 days.

(21) Appl. No.: 17/944,947

(22) Filed: Sep. 14, 2022

(65) Prior Publication Data
US 2024/0089155 A1  Mar. 14, 2024

(51) Int. Cl.
*H04L 27/00* (2006.01)
*H04W 12/02* (2009.01)

(52) U.S. Cl.
CPC ......... *H04L 27/0008* (2013.01); *H04W 12/02* (2013.01)

(58) Field of Classification Search
CPC .......................... H04L 27/0008; H04W 12/02
See application file for complete search history.

(56) References Cited

U.S. PATENT DOCUMENTS

| | | | |
|---|---|---|---|
| 2008/0181326 A1* | 7/2008 | Krueger | H04L 27/0008 375/261 |
| 2012/0002708 A1* | 1/2012 | Freundlich | H04L 27/3427 375/220 |
| 2016/0156498 A1* | 6/2016 | Loghin | H04L 27/0008 375/298 |

FOREIGN PATENT DOCUMENTS

| | | |
|---|---|---|
| EP | 2282471 A1 | 2/2011 |
| WO | 2017196425 A1 | 11/2017 |
| WO | 2018057239 A1 | 3/2018 |

* cited by examiner

*Primary Examiner* — Sung S Ahn
(74) *Attorney, Agent, or Firm* — Treyz Law Group, P.C.; Michael H. Lyons (57) ABSTRACT

A first device may transmit a first symbol for a second device and a second symbol for a third device. The first device may generate a first dictionary and a second dictionary that satisfy a complementary rule. The first device may modulate the first symbol onto an entry from the first dictionary to produce first modulated data and may modulate the second symbol onto an entry from the second dictionary to produce second modulated data. The first device may generate a third symbol as a joint modulation of the first and second modulated data and may transmit the third symbol using a resource element. The second device may decode the third symbol based on the first dictionary to recover the first symbol. The third device may decode the third symbol based on the second dictionary to recover the second symbol. Privacy may be maintained between the second and third devices.

20 Claims, 8 Drawing Sheets

WIRELESS DEVICES WITH PRIVACY MODULATION CODING

FIELD

This disclosure relates generally to wireless communications, including wireless communications performed by electronic devices.

BACKGROUND

Communications systems can include electronic devices with wireless communications capabilities. Electronic devices with wireless communications capabilities use antennas to convey data using radio-frequency signals. Wireless data is modulated onto the radio-frequency signals using a corresponding coding scheme. As the number of electronic devices with wireless communications capabilities has increased over time, demand for spectrum resources for wireless communications has escalated.

It can therefore be difficult to manage spectrum resources when an electronic device needs to transmit different wireless data to different receiving devices. In addition, if care is not taken, wireless data intended for one receiving device may be undesirably exposed to another receiving device.

SUMMARY

Electronic devices may be provided with wireless capabilities. The electronic devices may include a transmitting device, a first receiving device, and a second receiving device. The transmitting device may transmit a first data symbol for the first receiving device and a second data symbol for the second receiving device. The transmitting device may define a transmit modulation constellation of higher modulation order than the first and second receiving devices.

The transmitting device may apply a first grouping function on the transmit modulation constellation to generate a first dictionary for the first receiving device. The transmitting device may apply a second grouping function on the transmit constellation to generate a second dictionary for the second receiving device. The first and second dictionaries may satisfy a complementary rule. The transmitting device may group multiple entries from different items of the first dictionary into first clusters in the first dictionary. The transmitting device may group multiple entries from different items of the second dictionary into second clusters in the second dictionary. If desired, the transmitting device may perform rate splitting by making the clusters larger to support higher rates or smaller to support lower rates. If desired, the transmitting device may generate the clusters based on signal-to-noise ratio (SNR) information associated with the second and third devices.

The transmitting device may modulate the first data symbol onto an entry from the first dictionary to produce first modulated data. The transmitting device may modulate the second data symbol onto an entry from the second dictionary to produce second modulated data. The transmitting device may generate a third symbol as a joint modulation of the first modulated data and the second modulated data (e.g., from the intersection of the first and second modulated data). The transmitting device may transmit the third symbol in radio-frequency signals (e.g., using a single resource element). The first and second receiving devices may receive the radio-frequency signals.

The first receiving device may decode the received signals using a first codebook associated with the first dictionary. The second receiving device may decode the received signals using a second codebook associated with the second dictionary. The first receiving device may decode the first symbol by selecting a cluster of alphabets having a minimum distance metric value to a candidate symbol in the received signals. The second receiving device may decode the second symbol by selecting a cluster of alphabets having a minimum distance metric value to a candidate symbol in the received signals. In this way, the first and second receiving devices may decode different information values from the same symbol transmitted by the transmitting device, thereby preserving privacy between the second and third devices.

An aspect of the disclosure provides a method of operating a first electronic device to transmit a first data symbol to a second electronic device. The method can include with one or more processors, generating, based on a transmit modulation constellation, a dictionary having a set of items, each item in the set of items corresponding to a different respective information value for the data symbol and each item in the set of items including multiple points from the transmit modulation constellation. The method can include with the one or more processors, generating modulated data by modulating the data symbol onto a point from an item in the dictionary. The method can include with the one or more processors, generating a second data symbol based on the modulated data. The method can include with one or more antennas, transmitting a radio-frequency signal that includes the second data symbol.

An aspect of the disclosure provides a method of using a first electronic device to transmit a first data symbol to a second electronic device and a second data symbol to a third electronic device. The method can include with one or more processors, generating, based on a transmit modulation constellation, a first dictionary associated with the second electronic device. The method can include with the one or more processors, generating, based on the transmit modulation constellation, a second dictionary associated with the third electronic device. The method can include with the one or more processors, generating first modulated data by modulating the first data symbol onto a first entry from the first dictionary. The method can include with the one or more processors, generating second modulated data by modulating the second data symbol onto a second entry from the second dictionary. The method can include with the one or more processors, generating a third data symbol based on the first modulated data and the second modulated data. The method can include with one or more antennas, transmitting a radio-frequency signal that includes the third data symbol.

An aspect of the disclosure provides an electronic device. The electronic device can include storage that stores a demodulation codebook. The electronic device can include one or more antennas configured to receive a radio-frequency signal having a candidate symbol. The electronic device can include a decoder configured to compute point-to-group distance metric values between the candidate symbol and a set of clusters of alphabets identified by the demodulation codebook, and output a decoded symbol corresponding to a cluster from the set of clusters having a minimum point-to-group distance metric value.

DETAILED DESCRIPTION

Figure 1:
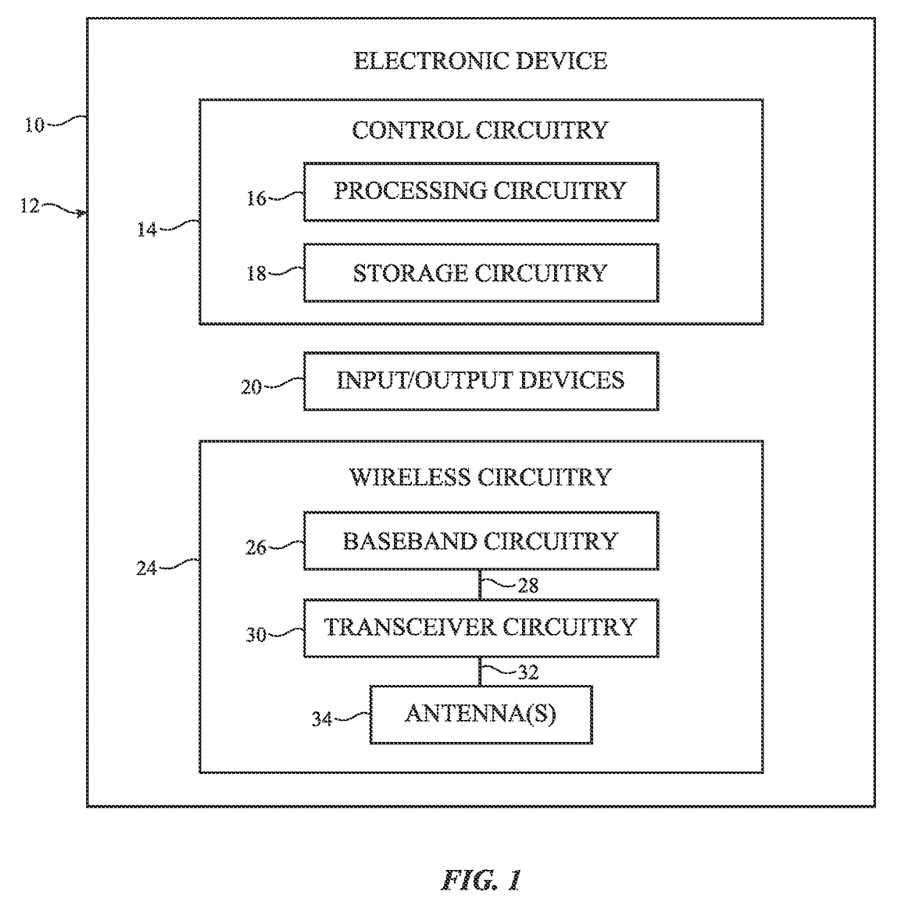
FIG. 1 is a schematic block diagram of an illustrative electronic device in accordance with some embodiments.

FIG. 1 is a block diagram of an illustrative electronic device 10. Device 10 may be a computing device such as a laptop computer, a desktop computer, a computer monitor containing an embedded computer, a tablet computer, a cellular telephone (mobile phone), a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 18. Storage circuitry 18 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 18 may include storage that is integrated within device 10 and/or removable storage media.

Control circuitry 14 may include processing circuitry such as processing circuitry 16. Processing circuitry 16 may be used to control the operation of device 10. Processing circuitry 16 may include on one or more processors such as microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 18 (e.g., storage circuitry 18 may include non-transitory (tangible) computer readable storage media that stores the software code). The software code may sometimes be referred to as program instructions, software, data, instructions, or code. Software code stored on storage circuitry 18 may be executed by processing circuitry 16.

Control circuitry 14 may be used to run software on device 10 such as one or more software applications (apps). The applications may include satellite navigation applications, internet browsing applications, voice-over-internet-protocol (VOIP) telephone call applications, email applications, media playback applications, operating system functions, gaming applications, productivity applications, workplace applications, augmented reality (AR) applications, extended reality (XR) applications, virtual reality (VR) applications, scheduling applications, consumer applications, social media applications, educational applications, banking applications, spatial ranging applications, sensing applications, security applications, media applications, streaming applications, automotive applications, video editing applications, image editing applications, rendering applications, simulation applications, camera-based applications, imaging applications, news applications, and/or any other desired software applications.

To support interactions with external communications equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, 6G protocols, cellular sideband protocols, etc.), device-to-device (D2D) protocols, antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communications protocol may be associated with a corresponding radio access technology (RAT) that specifies the physical connection methodology used in implementing the protocol. Radio-frequency signals conveyed using a cellular telephone protocol may sometimes be referred to herein as cellular telephone signals.

Device 10 may include input-output devices 20. Input-output (I/O) devices 20 may be used to allow data to be supplied to device 10 and to allow data to be provided from device 10 to external devices. Input-output devices 20 may include user interface devices, data port devices, and other input-output components. For example, input-output devices 20 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, image sensors, light sensors, radar sensors, lidar sensors, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 20 may be peripherals that are coupled to a main processing unit or other portion of device 10 via a wired or wireless link).

Electronic device 10 may include wireless circuitry 24. Wireless circuitry 24 may support wireless communications. Wireless circuitry 24 (sometimes referred to herein as wireless communications circuitry 24) may include one or more antennas 34. Antennas 34 may transmit radio-frequency signals to and/or may receive radio-frequency signals from external communications equipment. The external communications equipment may include one or more other electronic devices such as device 10.

Wireless circuitry 24 may also include baseband circuitry 26 (e.g., one or more baseband processors or other circuitry that operates at baseband). Wireless circuitry 24 may include transceiver circuitry 30 coupled to baseband circuitry 26 over one or more baseband paths 28 (sometimes referred to herein as baseband signal paths 28 or signal paths 28). Transceiver circuitry 30 may include one or more transceivers (e.g., one or more transmitters and/or receivers). Transceiver circuitry 30 may be coupled to antenna(s) 34 over one or more radio-frequency transmission lines 32.

Radio-frequency transmission lines 32 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 32 may be integrated into rigid and/or flexible printed circuit boards if desired. One or more radio-frequency lines 32 may be shared between multiple transceivers in transceiver circuitry 30 if desired. Radio-frequency front end (RFFE) modules may be interposed on one or more radio-frequency transmission lines 32. The radio-frequency front end modules may include substrates, integrated circuits, chips, or packages that are separate from transceiver circuitry 30 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 32.

In performing wireless transmission, baseband circuitry 26 may provide baseband signals (e.g., baseband signals containing wireless data for transmission to one or more other devices) to transceiver circuitry 30 over baseband path(s) 28. For example, the baseband circuitry may process incoming digital data through encoding, modulation/demodulation, time and frequency conversions, pulse shaping, etc., to generate processed baseband data that is conveyed by the baseband signals. Transceiver circuitry 30 may modulate the processed baseband data onto radio-frequency signals for transmission by antenna(s) 34. For example, transceiver circuitry 30 may include mixer circuitry and local oscillator circuitry for up-converting the baseband signals to radio-frequencies prior to transmission over antenna(s) 34. Transceiver circuitry 30 may also include digital-to-analog converter (DAC) circuitry for converting signals between digital and analog domains, amplifier circuitry (e.g., power amplifier circuitry) for amplifying the radio-frequency signals, filter circuitry, switching circuitry, etc. Transceiver circuitry 30 may transmit the radio-frequency signals over antenna(s) 34 via radio-frequency transmission line path(s) 32. Antenna(s) 34 may transmit the radio-frequency signals to external wireless equipment by radiating the radio-frequency signals into free space.

Antenna(s) 34 may be formed using any desired antenna structures for conveying radio-frequency signals. For example, antenna(s) 34 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antenna(s) 34 over time. If desired, two or more of antennas 34 may be integrated into a phased antenna array (sometimes referred to herein as a phased array antenna) in which each of the antennas conveys radio-frequency signals with a respective phase and magnitude that is adjusted over time so the radio-frequency signals constructively and destructively interfere to produce a signal beam in a given/selected beam pointing direction (e.g., towards external communications equipment).

The term "convey radio-frequency signals" as used herein means the transmission and/or reception of the radio-frequency signals (e.g., for performing unidirectional and/or bidirectional wireless communications with external wireless communications equipment). Similarly, the term "convey wireless data" as used herein means the transmission and/or reception of wireless data using radio-frequency signals. Antenna(s) 34 may transmit the radio-frequency signals by radiating the radio-frequency signals into free space (or to free space through intervening device structures such as a dielectric cover layer). Antenna(s) 34 may additionally or alternatively receive the radio-frequency signals from free space (e.g., through intervening devices structures such as a dielectric cover layer). The transmission and reception of radio-frequency signals by antennas 34 each involve the excitation or resonance of antenna currents on an antenna resonating element in the antenna by the radio-frequency signals within the frequency band(s) of operation of the antenna.

In performing wireless reception, antenna(s) 34 may receive radio-frequency signals from one or more other devices. Antenna(s) 34 may pass the received radio-frequency signals to transceiver circuitry 30 over radio-frequency transmission line(s) 32. Transceiver circuitry 30 may include demodulation circuitry, mixer circuitry for down-converting signals from intermediate frequencies and/or radio frequencies to baseband frequencies, amplifier circuitry (e.g., one or more low-noise amplifiers (LNAs)), analog-to-digital converter (ADC) circuitry, control paths, power supply paths, signal paths, switching circuitry, filter circuitry, and/or any other circuitry for receiving radio-frequency signals using antenna(s) 34. Transceiver circuitry 30 may convert the received radio-frequency signals into baseband signals. Transceiver circuitry 30 may transmit the baseband signals to baseband circuitry 26 over path 28. Baseband circuitry 26 may process incoming digital data from the received baseband signals through decoding, demodulation, time and frequency conversions, pulse shaping, etc., to extract wireless data from the baseband signals. The extracted wireless data may be passed up the protocol stack or to an application processor for further processing.

Transceiver circuitry 30 may transmit and/or receive radio-frequency signals within corresponding frequency bands at radio frequencies (sometimes referred to herein as communications bands or simply as "bands"). The frequency bands handled by transceiver circuitry 30 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, cellular sidebands, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 24 may also be used to perform spatial ranging operations if desired.

The example of FIG. 1 is illustrative and non-limiting. While control circuitry 14 is shown separately from wireless circuitry 24 in the example of FIG. 1 for the sake of clarity, wireless circuitry 24 may include processing circuitry (e.g., one or more processors) that forms a part of processing circuitry 16 and/or storage circuitry that forms a part of storage circuitry 18 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of transceiver circuitry 30. Baseband circuitry 26 may, for example, access a communication protocol stack on control circuitry 14 (e.g., storage circuitry 18) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum (NAS) layer.

Device 10 may be used to transmit wireless data to one or more other devices such as device 10. In some situations, device 10 may wish to transmit different wireless data to different devices. During signal transmission, baseband circuitry 26 may modulate the wireless data onto a digital signal (e.g., producing the baseband signals on baseband path(s) 28). The modulation may be represented visually by a constellation diagram. Different modulation schemes have different constellation diagrams. The constellation diagram has a horizontal real axis and a vertical imaginary axis. The wireless data may be organized into symbols (e.g., where each symbol represents one or more different binary digits of information). Each symbol may be represented by a different point on the constellation diagram. Each point may correspond to a different combination of phase and amplitude of modulation onto a carrier wave (e.g., where distance from the origin to the point represents the magnitude and the angle of a vector clockwise from the origin to the point about the horizontal axis represents the phase of the signal).

Device 10 may also be used to receive wireless data from one or more other devices such as device 10. During signal reception, baseband circuitry 26 may decode wireless data from a digital baseband signal on baseband path(s) 28. The decoding may, for example, involve mapping a received signal to a corresponding (e.g., closest) point on the constellation diagram representing the modulation scheme used by the device (e.g., by comparing the phase and magnitude of the received signal to the phases and magnitudes of the points on the constellation diagram).

Figure 2:
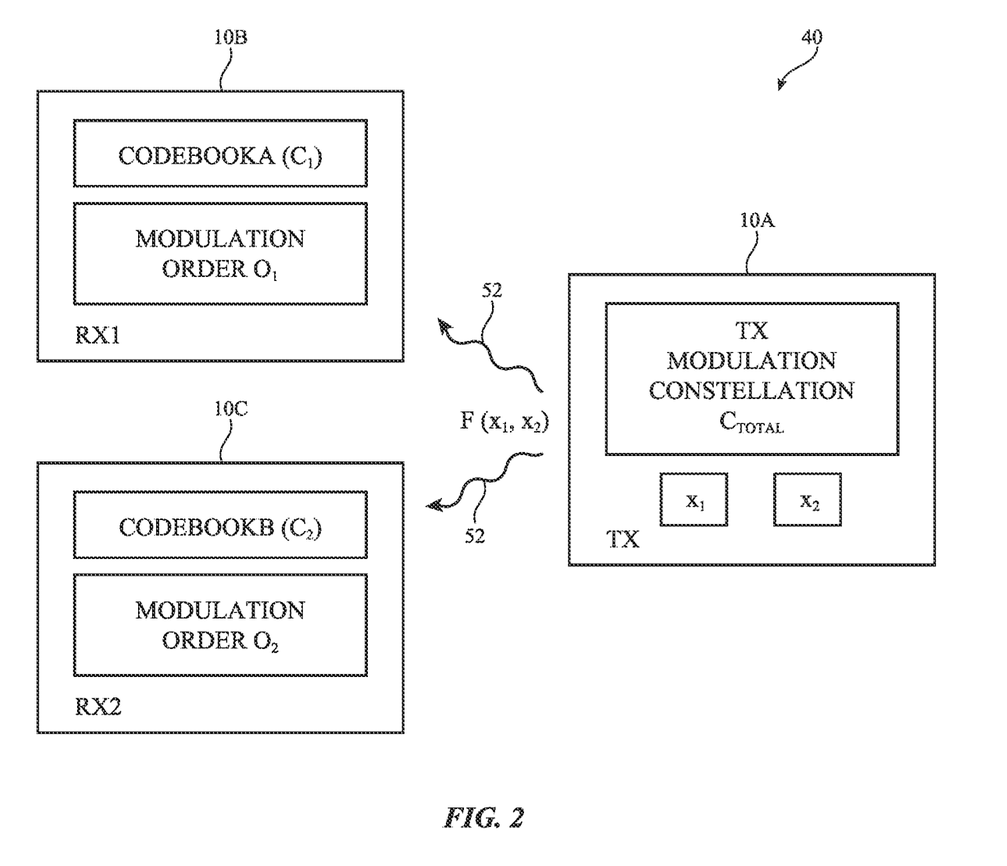
FIG. 2 is a diagram of an illustrative communications system having a transmitting device that transmits different wireless data to at least a first receiving device and a second receiving device in accordance with some embodiments.

FIG. 2 is a diagram showing how a single device 10 may transmit wireless data to at least two other devices 10. As shown in FIG. 2, a communication system (network) 40 may include at least a first device 10A, a second device 10B, and a third device 10C. Device 10A may have wireless data for transmission to devices 10B and 10C. Device 10A may therefore sometimes be referred to herein as transmitting (TX) device 10A. Device 10B may sometimes be referred to herein as receiving (RX) device 10B, receiving device RX1, or simply as device RX1. Device 10C may sometimes be referred to herein as receiving (RX) device 10C, receiving device RX2, or simply as device RX2.

TX device 10A may have wireless data $x_1$ for transmission to device RX1 and may have wireless data $x_2$ for transmission to device RX2. Wireless data $x_1$ may include a piece of information for receipt by device RX1 such as a symbol of data, and may therefore sometimes be referred to herein as symbol $x_1$ or data symbol $x_1$. Wireless data $x_2$ may include a piece of information for receipt by device RX2 such as a symbol of data, and may therefore sometimes be referred to herein as symbol $x_2$ or data symbol $x_2$. TX device 10A may use radio-frequency signals 52 to transmit symbols $x_1$ and $x_2$. TX device 10A may have additional data for transmission to other RX devices (e.g., N total RX devices), but a simplest case in which N=2 is illustrated herein as an example.

It may be desirable to transmit symbols $x_1$ and $x_2$ without using a success interference cancellation (SIC) scheme. An SIC-free modulation scheme may, for example, enable lower complexity in parallel operations while preserving information privacy among different RX devices, which is particularly useful in massive multiuser transmission scenarios. To minimize the physical layer transmission unit in the time-frequency-space grid and thus the resources required at TX device 10A (thereby maximizing spectral efficiency), TX device 10A may transmit both symbols $x_1$ and $x_2$ using a single transmission resource element (RE) instead of using two separate transmission resource elements for symbols $x_1$ and $x_2$. Since both symbols $x_1$ and $x_2$ share the same transmission RE, a process may be required to guarantee that device RX1 does not need any information for or about device RX2 to decode its own symbol $x_1$ from the transmission RE and to guarantee that device RX2 does not need any information for or about device RX1 to decode its own symbol $x_2$ from the transmission RE.

To meet these goals, TX device 10A may transmit a single symbol $F(x_1,x_2)$ in a single transmission RE. F( ) is a privacy modulation coding scheme (function) that codes symbols $x_1$ and $x_2$ onto the same RE while preserving privacy (e.g., while preventing device RX1 from easily decoding symbol $x_2$, preventing device RX2 from easily decoding symbol $x_1$, allowing device RX1 to decode symbol $x_1$ without requiring any information about device RX2, and allowing device RX2 to decode symbol $x_2$ without requiring any information about device RX1).

TX device 10A may transmit symbol $F(x_1,x_2)$ in radio-frequency signals 52 using a TX modulation constellation $C_{TOTAL}$. RX devices 10A and 10B may receive radio-frequency signals 52. RX device 10A may decode (recover) symbol $x_1$ from the symbol $F(x_1,x_2)$ in radio-frequency signals 52 using a corresponding demodulation codebook such as codebook CODEBOOKA and a corresponding modulation order $O_1$. RX device 10B may decode (recover) symbol $x_2$ from the symbol $F(x_1,x_2)$ in radio-frequency signals 52 using a corresponding demodulation codebook such as codebook CODEBOOKB and a corresponding modulation order $O_2$. Codebook CODEBOOKA and modulation order $O_1$ may be stored on RX device 10A and may be unknown to RX device 10B. Codebook CODEBOOKB and modulation order $O_2$ may be stored on RX device 10B and may be unknown to RX device 10A. Codebooks CODEBOOKA and CODEBOOKB and modulation orders $O_1$ and $O_2$ may be known to TX device 10A. Codebook CODEBOOKA of RX device 10A may represent a first dictionary $C_1$. Codebook CODEBOOKB of RX device 10B may represent a second dictionary $C_2$.

RX device 10A may demodulate symbol $F(x_1,x_2)$ using codebook CODEBOOKA to decode symbol $x_1$ without decoding or being exposed to symbol $x_2$. However, since RX device 10B has a different codebook CODEBOOKB, when RX device 10B demodulates symbol $F(x_1,x_2)$ using codebook CODEBOOKB, RX device 10B will instead decode symbol $x_2$ without decoding or being exposed to symbol $x_1$. This privacy-preserving effect may be produced by the generation of symbol $F(x_1,x_2)$ and the privacy modulation coding scheme utilized by TX device 10A in transmitting radio-frequency signals 52.

Figure 3:
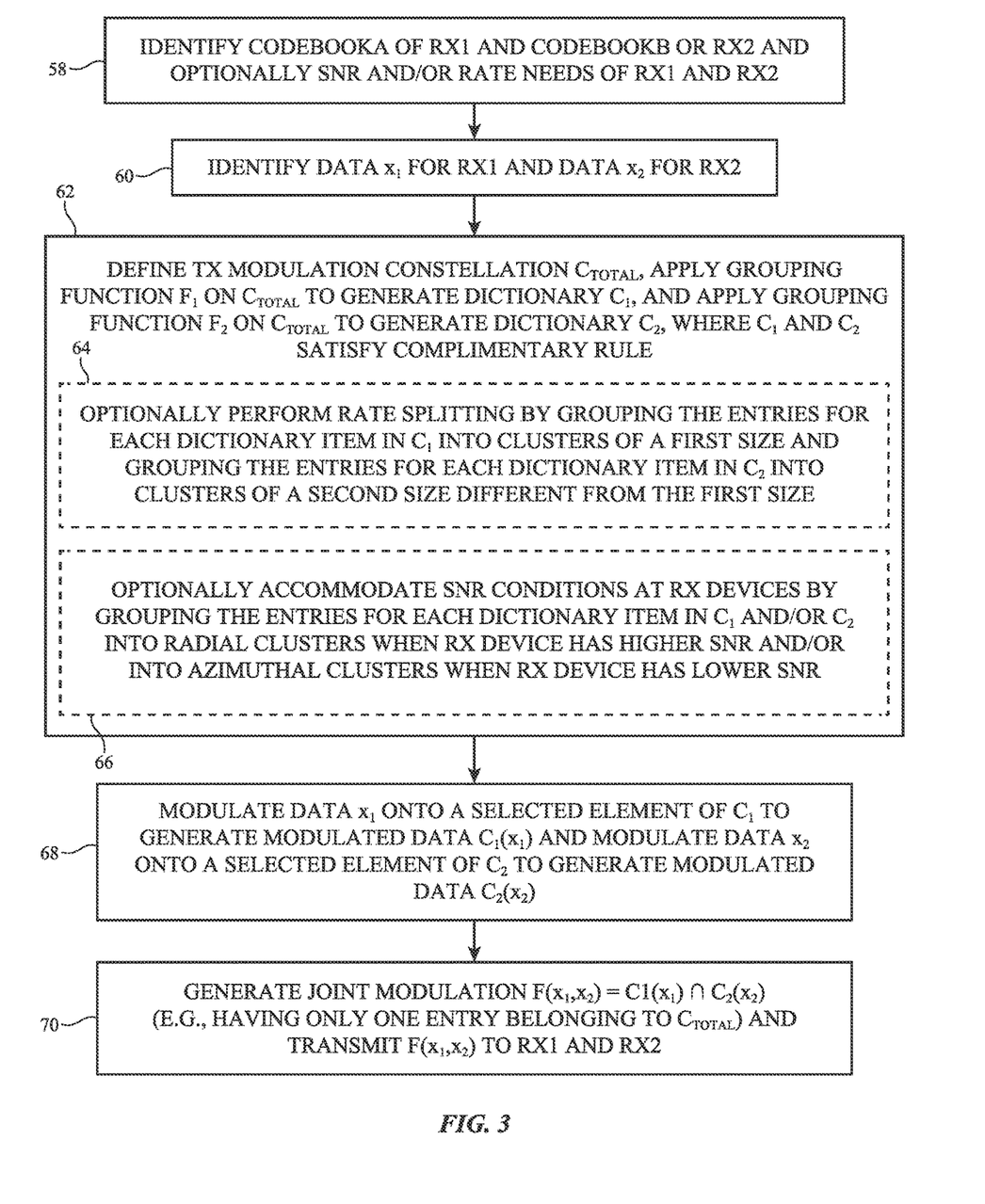
FIG. 3 is a flow chart of illustrative operations that may be performed by a transmitting device to code wireless data for first and second receiving devices while optimizing resources and maintaining privacy in accordance with some embodiments.

FIG. 3 is a flow chart of operations that may be performed by TX device 10A to transmit symbol $x_1$ to device RX1 and to transmit symbol $x_2$ to device RX2 using the privacy modulation coding scheme (e.g., to code symbols $x_1$ and $x_2$ for transmission to devices RX1 and RX2 using the same resource element in a privacy-preserving manner). The operations of FIG. 3 may, for example, be performed by baseband circuitry 26 and/or control circuitry 14 (FIG. 1) on TX device 10A.

At operation 58, TX device 10A may identify the codebook CODEBOOKA and the corresponding modulation order $O_1$ of device RX1 and the codebook CODEBOOKB and the corresponding modulation order $O_2$ of device RX2. TX device 10A may, for example, learn codebooks CODEBOOKA and CODEBOOKB and modulation orders $O_1$ and $O_2$ via a machine learning process (e.g., involving signal exchange between devices RX1, RX2, and TX device 10A that lead to constellation knowledge of devices RX1 and RX2 at TX device 10A), as part of a specification governing wireless communication between devices 10, the codebooks may be pre-programmed on TX device 10A, and/or TX device 10A may analytically generate/determine the codebooks for devices RX1 and RX2.

If desired, devices RX1 and RX2 may transmit information to TX device 10A identifying the signal-to-noise ratio (SNR) conditions at devices RX1 and RX2 relative to TX device 10A (e.g., in a channel state feedback report or SNR report) and/or TX device 10A may estimate the SNR conditions based on signals received from devices RX1 and RX2, channel propagation conditions between TX device 10A and devices RX1 and RX2, etc. If desired, devices RX1 and RX2 may transmit information to TX device 10A identifying the rate requirements or needs of devices RX1 and RX2 in receiving wireless data (e.g., the rate policies of devices RX1 and RX2).

At operation 60, TX device 10A may identify symbol $x_1$ for transmission to device RX1 and symbol $x_2$ for transmission to device RX2. For example, an application running on TX device 10A may provide the baseband circuitry on TX device 10A with symbols $x_1$ and $x_2$.

At operation 62, TX device 10A may define its own TX modulation constellation $C_{TOTAL}$. TX device 10A may apply a first grouping function $F_1$ on $C_{TOTAL}$ to generate dictionary $C_1$ for device RX1. TX device 10A may apply a second grouping function $F_2$ on $C_{TOTAL}$ to generate dictionary $C_2$ for device RX2. The grouping functions may be selected such that dictionaries $C_1$ and $C_2$ satisfy the complementary rule. The complementary rule states that nearby (clustered) alphabets in dictionary $C_1$ are grouped together as an item in dictionary $C_2$ by grouping function $F_2$.

Modulation order may be defined by the number of points on the constellation diagram of a corresponding device 10. For the sake of illustration, an example is described herein in which the modulation order $O_1$ of device RX1 is 16 and the modulation order $O_2$ of device RX2 is 16. In general, any modulation orders may be used. In this example, the constellation diagram of device RX1 has 16 points and the constellation diagram of device RX2 has 16 points (although the location of the points for device RX1 are unknown to device RX2 and vice versa). A modulation order of 16 supports the transmission of 4-bit data, which is represented by 16 different patterns that can be used for transmission (e.g., "0000," "0001," "0010," etc.). Each of the 16 patterns corresponds to one of the points on the constellation diagram. The points on the constellation diagram of device RX1 may be specified by codebook CODEBOOKA whereas the points on the constellation diagram of device RX2 may be specified by codebook CODEBOOKB.

Since symbol $F(x_1,x_2)$ needs to carry the data pattern for both device RX1 and RX2, TX device 10A may use a higher modulation order than modulation orders $O_1$ and $O_2$. For example, TX device 10A may use a modulation order of size $2^{(\log_2(O_1)+\log_2(O_2))}$, which is equal to 256 in this example. In other words, TX device 10A may use a modulation order of 256 and thus a modulation constellation with 256 points. The points on the modulation constellation (e.g., points on the constellation diagram for TX device 10A) may each represent a corresponding alphabet. As such, TX device 10A may use a modulation constellation with 256 alphabets to jointly convey symbols $x_1$ and $x_2$.

To modulate symbols $x_1$ and $x_2$ onto the modulation constellation of TX device 10A, TX device 10A may define modulation constellation $C_{TOTAL}$ having a modulation order of 256 (e.g., 256 alphabets or points on the corresponding constellation diagram). TX device 10A may apply grouping function $F_1$ on $C_{TOTAL}$, which outputs dictionary $C_1$ for device RX1. Dictionary $C_1$ has 16 different items (elements) (e.g., equal to the modulation order of device RX1), each represented by a different index value from 1 to 16. Each item of dictionary $C_1$ corresponds to a respective one of the information values (e.g., symbol or data values) that can be transmitted by TX device 10A. Each item (element) of dictionary $C_1$ (e.g., each index) has a set of 16 entries (sub-elements). Each entry forms a different respective point on the constellation diagram of $C_{TOTAL}$ and all 16 entries of a given item of dictionary $C_1$ represents the same data value (e.g., carry the same information or symbol for device RX1).

Similarly, TX device 10A may apply grouping function $F_2$ on $C_{TOTAL}$, which outputs dictionary $C_2$ for device RX2. Dictionary $C_2$ also has 16 different items (elements) (e.g., equal to the modulation order of device RX2), each represented by a different index value from 1 to 16. Each item of dictionary $C_2$ corresponds to a respective one of the information values (e.g., symbol or data values) that can be transmitted by TX device 10A. Each item (element) of dictionary $C_1$ (e.g., each index) has a set of 16 entries (sub-elements). Each entry forms a different respective point on the constellation diagram of $C_{TOTAL}$ and all 16 entries of a given item of dictionary $C_2$ represents the same data value (e.g., carry the same information or symbol for device RX2).

Figure 4:
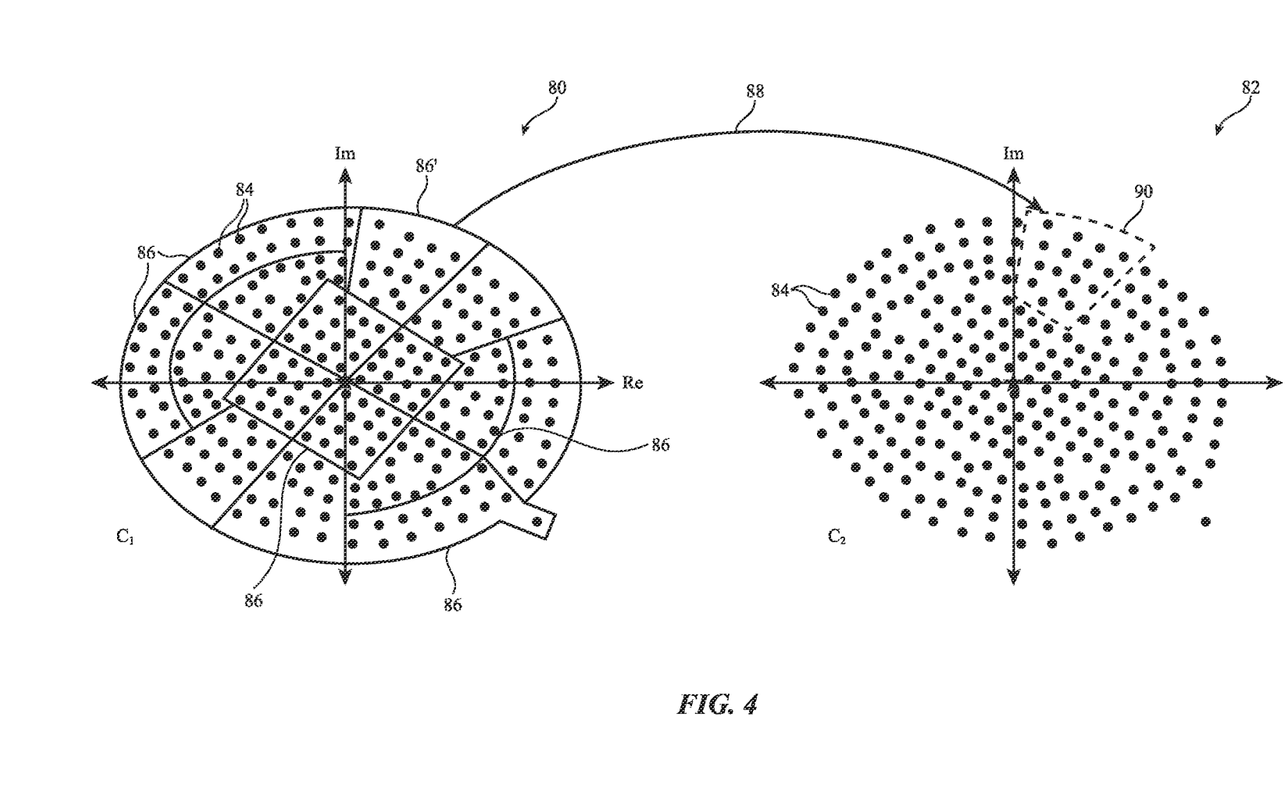
FIG. 4 shows illustrative constellation diagrams for a first receiving device and a second receiving device that may be processed by a transmitting device in transmitting wireless data to the first and second receiving devices in accordance with some embodiments.

FIG. 4 includes a constellation diagram 80 of the dictionary $C_1$ and a constellation diagram 82 of the dictionary $C_2$ that may be generated by TX device 10A by applying grouping function $F_1$ and grouping function $F_2$ to $C_{TOTAL}$, respectively. Each point 84 on constellation diagram 80 represents a different entry or alphabet of dictionary $C_1$. Each point 84 on constellation diagram 80 represents a different entry or alphabet of dictionary $C_2$. Points 84 may be given by the points in $C_{TOTAL}$ (not shown). Codebook CODEBOOKA of device RX1 may be represented by dictionary $C_1$ and thus constellation diagram 80. Codebook CODEBOOKB of device RX2 may be represented by dictionary $C_2$ and thus constellation diagram 82.

As shown in FIG. 4, dictionary $C_1$ may include different sets 86 of points 84. Each set 86 forms a different item of dictionary $C_1$. Sets 86 may therefore be referred to herein as items 86 of dictionary $C_1$. As such, there are 16 items 86 shown in constellation diagram 80. The points 84 in each item 86 represent the entries of that item 86. As such, there are 16 points 84 in each item 86 shown in constellation diagram 80. Each point 84 of a given item 86 represents the same information (data/symbol) value. The 16 points 84 of a first of the 16 items 86 may therefore represent the data value "0000," whereas the points 84 of a second of the 16 items 86 represents the data value "0001," the points 84 of a third of the 16 items 86 represents the data value "0010," etc.

The points 84 in dictionary $C_1$ (constellation diagram 80) are grouped into clusters of points belonging to the same item 86. In other words, each item 86 is formed from a group (cluster) or adjacent or neighboring points 84 from constellation diagram 80. Applying grouping function $F_1$ to $C_{TOTAL}$ may configure the clustering of points 84 in dictionary $C_1$ this way. On the other hand, while the points 84 are at the same locations in constellation diagram 82 (dictionary $C_2$) as the points 84 in constellation diagram 80 (dictionary $C_1$), the points 84 in dictionary $C_2$ are not grouped together with other points 84 (entries) of the same dictionary item.

Applying grouping function $F_2$ to $C_{TOTAL}$ may configure the clustering of points 84 in dictionary $C_2$ in this way. More particularly, the points 84 in dictionary $C_2$ overlapping the region spanned by any given item 86 in dictionary $C_1$ will include no more than one point 84 from each entry of dictionary $C_2$. For example, dictionary $C_1$ may include an item 86'. As shown by arrow 88, the same region 90 spanned by the points 84 in item 86' may include a single point 84 from each entry of dictionary $C_2$. In other words, region 90 may include only a single point 84 corresponding to the information value represented by all of the points 84 in item 86' of dictionary $C_1$. This illustrates the complementary rule.

This may configure device RX1 and device RX2 to decode the same received symbol $F(x_1,x_2)$ (e.g., the same point on the constellation diagram) differently, because a given position (point 84) on constellation diagram 80 corresponds to a different information value (e.g., a different entry from dictionary $C_1$ and thus a different codebook entry/alphabet) than the same position (point 84) on constellation diagram 82. The one point 84 on constellation diagram 82 corresponding to the same information value within the region spanned by each item 86 in constellation diagram 80 may allow TX device 10A to transmit the same information value to device RX1 and device RX2 (e.g., in situations where symbol $x_1$ equals symbol $x_2$).

Returning to FIG. 3, TX device 10A may, if desired, perform multi-user rate splitting without power allocation or frequency/time resource allocation on the TX side. For example, at optional operation 64, TX device 10A may perform rate splitting when devices RX1 and RX2 have different rate policies. TX device 10A may perform rate splitting by grouping the entries (points 84) in the items 86 of dictionary $C_1$ into clusters having a first size in the corresponding constellation diagram. At the same time, TX device 10A may group the entries (points 84) in items 86 of dictionary $C_2$ into clusters having a second size in the corresponding constellation that is different from the first size.

Figure 5:
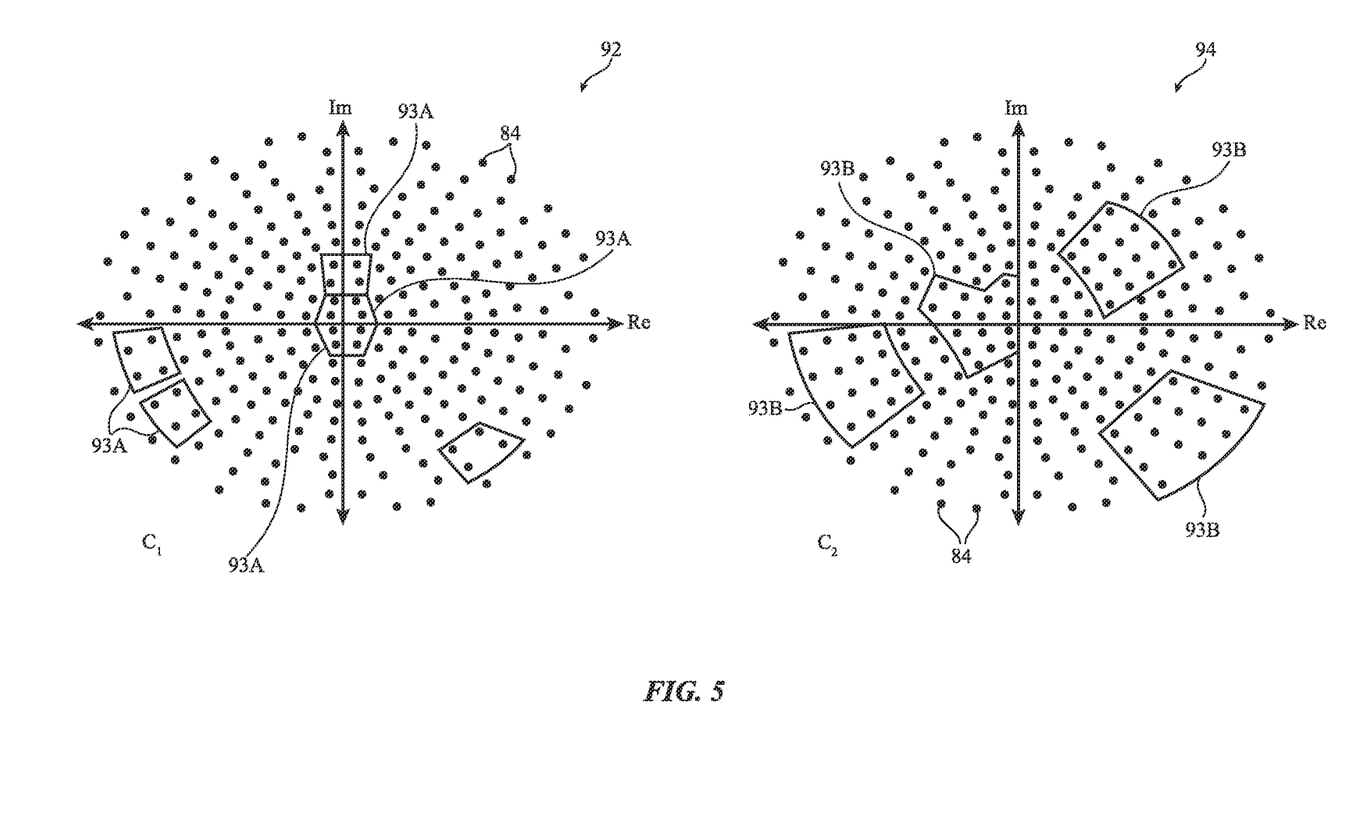
FIG. 5 includes illustrative constellation diagrams illustrating how a transmitting device may perform rate splitting between a first receiving device and a second receiving device in accordance with some embodiments.

Constellation diagram 92 of FIG. 5 illustrates one example of how dictionary $C_1$ may be configured to accommodate the first rate for device RX1. Constellation diagram 94 of FIG. 5 illustrates one example of how dictionary $C_2$ may be configured to accommodate the second rate for device RX1. As shown in constellation diagram 92 of FIG. 5, points 84 in dictionary $C_1$ may be grouped into clusters 93A of neighboring points 84 from the same item of dictionary $C_1$ (e.g., only some of the clusters 93A are annotated in constellation diagram 92 for the sake of simplicity). Each cluster 93A may, for example, include four points 84 from the same item of dictionary $C_1$.

As shown in constellation diagram 92 of FIG. 5, points 84 in dictionary $C_2$ may be grouped into clusters 93B of neighboring points 84 from the same item of dictionary $C_1$ (e.g., only some of the clusters 93B are annotated in constellation diagram 92 for the sake of simplicity). Each cluster 93B may, for example, include 16 points 84 from the same item of dictionary $C_2$. In other words, the points (entries) 84 of dictionary $C_2$ may be grouped into larger clusters 93B (e.g., groups of neighboring points that represent the same dictionary entry) than in dictionary $C_1$. The points 84 in dictionaries $C_1$ and $C_2$ of FIG. 5 represent different elements (points) from $C_{TOTAL}$.

This may configure dictionary $C_2$ to allow device RX2 to achieve a higher rate than device RX1. For example, when an RX device demodulates the received symbol $F(x_1,x_2)$, the RX device will map a received symbol to the closest constellation point in its constellation diagram. The larger the cluster, the more confidence the RX device will have that it has correctly identified the information represented by the received symbol, thereby maximizing the (transmission) rate of the RX device. If desired, an even rate split can be used (e.g., clusters 93A may be the same size as clusters 93B). TX device 10A may generate the rate-split dictionaries $C_1$ and $C_2$ of FIG. 5 using hyper parameters $\lambda$ in the grouping functions $F_1$ and $F_2$ applied to $C_{TOTAL}$, respectively (e.g., as grouping functions $F_1^\lambda$ and $F_2^\lambda$). In other words, grouping functions $F_1$ and $F_2$ may serve to group points 84 into different clusters 93 within the corresponding constellation diagram.

Returning to FIG. 3, TX device 10A may generate clusters 93 based on the SNR conditions of devices RX1 and RX2 (e.g., based on SNR reports or other channel reports received from devices RX1 and RX2). For example, at optional operation 66, TX device 10A may accommodate different SNR conditions at device RX1 and/or device RX2 by grouping the entries (points 84) in the items 86 of dictionary $C_1$ and/or $C_2$ into radial clusters 93C or azimuthal clusters 93D.

Figure 6:
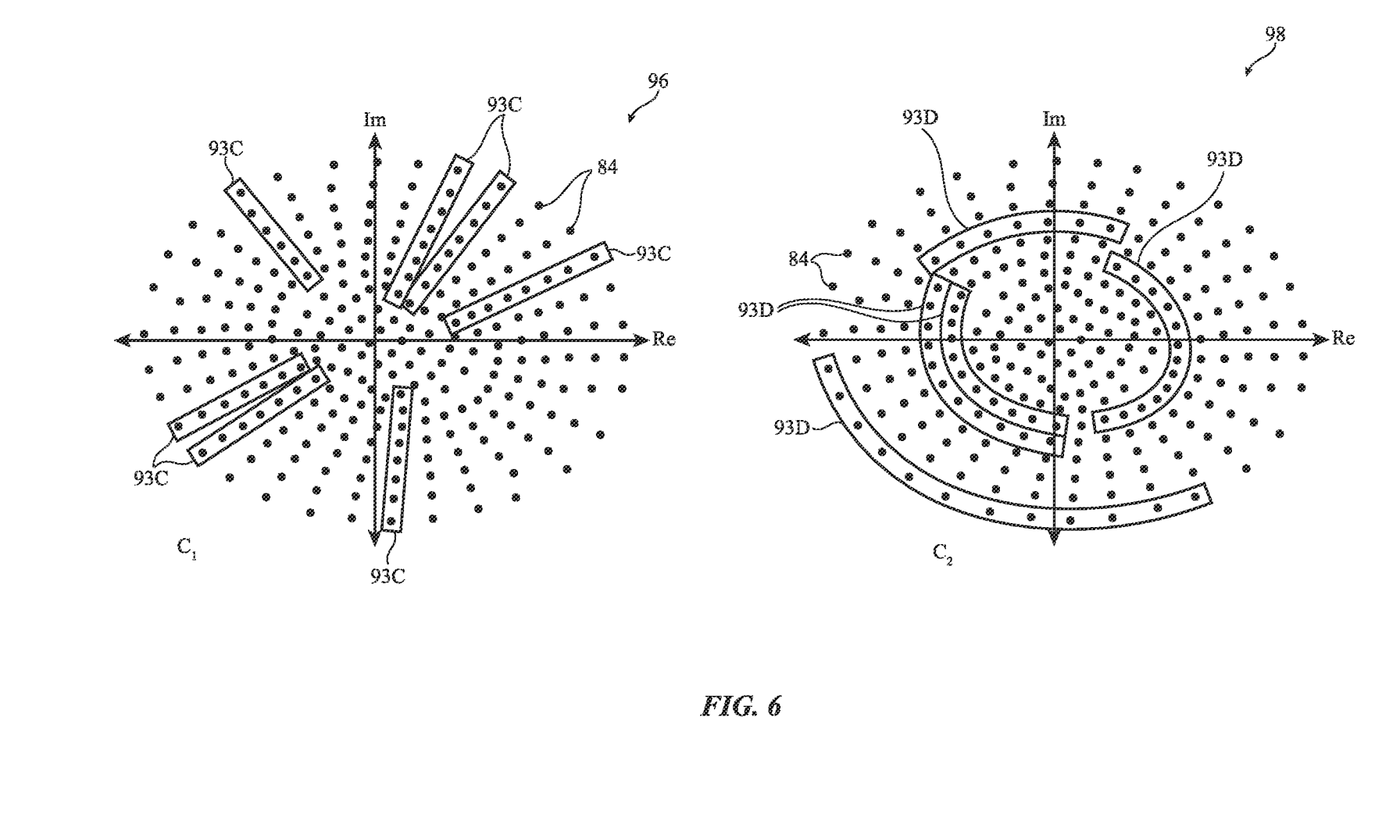
FIG. 6 includes illustrative constellation diagrams illustrating how a transmitting device may accommodate different signal-to-noise ratio (SNR) conditions while transmitting wireless data to first and second receiving devices in accordance with some embodiments.

Constellation diagram 96 of FIG. 6 illustrates one example of how the entries (points 84) in the items 86 of dictionary $C_1$ may be grouped into radial clusters 93C. As shown in constellation diagram 96 of FIG. 6, points 84 in dictionary $C_1$ may be grouped into radial clusters 93C of neighboring points 84 from the same item of dictionary $C_1$ (e.g., only some of the radial clusters 93C are annotated in constellation diagram 92 for the sake of simplicity). Each radial cluster 93C may, for example, include multiple neighboring points 84 from the same item of dictionary $C_1$. Radial clusters 93C may extend radially outwards from the origin of the constellation chart.

Constellation diagram 98 of FIG. 6 illustrates one example of how the entries (points 84) in the items 86 of dictionary $C_2$ may be grouped into azimuthal clusters 93D. As shown in constellation diagram 98 of FIG. 6, points 84 in dictionary $C_2$ may be grouped into azimuthal clusters 93D of neighboring points 84 from the same item of dictionary $C_2$ (e.g., only some of the azimuthal clusters 93D are annotated in constellation diagram 98 for the sake of simplicity). Each azimuthal cluster 93D may, for example, include multiple neighboring points 84 from the same item of dictionary $C_2$. Azimuthal clusters 93D may extend in an azimuthal direction about the origin of the constellation chart (e.g., tangential or orthogonal to the radial direction).

TX device 10A may generate a dictionary having radial clusters 93C when the RX device exhibits a relatively high SNR (e.g., device RX1 may exhibit an SNR or other channel characteristics that exceed a threshold value). TX device 10A may generate a dictionary having radial clusters 93C when the RX device exhibits a relatively low SNR (e.g., device RX2 may exhibit an SNR or other channel characteristics that are less than a threshold value). RX devices that exhibit high SNR are generally closer to TX device 10A (e.g., a wireless base station or other device) than RX devices that exhibit low SNR.

Clustering points 84 in dictionaries $C_1$ or $C_2$ in the radial direction (in radial clusters 93C) may allow a high SNR RX device to use different signal phases to distinguish between different data values when decoding the signal (e.g., where phase is measured by the angular position of the point 84 relative to the horizontal axis). On the other hand, clustering points 84 on the constellation diagram in the azimuthal direction (in azimuthal clusters 93D) may allow a low SNR RX device to use different signal magnitudes to distinguish between different data values when decoding the signal (e.g., where phase is measured by the angular position of the point 84 relative to the horizontal axis). RX devices with lower SNR (e.g., that are farther from TX device 10A) may more easily distinguish between different signal magnitudes than different signal phases during decoding (demodulation), whereas RX devices with higher SNR may more easily distinguish between different signal phases during decoding (demodulation). As such, grouping the points in dictionaries $C_1$ and $C_2$ in this way based on the SNR of devices RX1 and RX2 may help to allow low and high SNR RX devices to properly decode the received signal, thereby minimizing errors in the decoded data. These modulation schemes do not require any power allocation or frequency/time resource allocation at TX device 10A, since the constellation powers for symbols $x_1$ and $x_2$ are the same.

Returning to FIG. 3, at operation 68, TX device 10A may select one item from the generated dictionary $C_1$ (e.g., one item 86 as shown in FIG. 4) and may modulate symbol $x_1$ using the selected item (e.g., any entry/alphabet 84 of the selected item 86), producing modulated symbol $C_1(x_1)$. TX device 10B may select one item from the generated dictionary $C_2$ and may modulate symbol $x_2$ using the selected item (e.g., any entry/alphabet 84 of the selected item), producing modulated symbol $C_2(x_2)$. Each item from dictionary $C_1$ and each item from dictionary $C_2$ includes 16 alphabets/entries (e.g., points 84 of FIGS. 4-6).

At operation 70, TX device 10A may generate symbol $F(x_1, x_2)$, which is a joint modulation of $C_1(x_1)$ and $C_2(x_2)$. For example, TX device 10A may generate symbol $F(x_1, x_2)$ as the intersection of $C_1(x_1)$ and $C_2(x_2)$ (e.g., by generating, computing, calculating, identifying, or determining $C_1(x_1) \cap C_2(x_2)$, where $\cap$ is the intersection of sets operator, which generates a new set from the common elements of $C_1(x_1)$ and $C_2(x_2)$). Note that $C_1(x_1) \cap C_2(x_2)$ has only one entry belonging to $C_{TOTAL}$ (e.g., $F(x_1, x_2)$ is a single symbol from $C_{TOTAL}$). In other words, there is always one common point between the 16 points in codebook CODEBOOKA for device RX1 and in codebook CODEBOOKB for device RX2. When device RX1 receives the common point (symbol $F(x_1, x_2)$), device RX1 may decode the point as a first data value that corresponds to symbol $x_1$ (e.g., "0000") whereas device RX2 may decode that same point as a second data value that corresponds to symbol $x_2$ (e.g., "0001").

The example of FIGS. 2-7 in which TX device 10A transmits respective symbols $x_1$ and $x_2$ to devices RX1 and RX2 is illustrative and non-limiting. In a most general case, system 40 (FIG. 2) may include M different TX devices 10A (or M different transmitters on any number of TX devices) that transmit N different information symbols $x_n$ to N different RX devices (or N different receivers on any number of RX devices). M may be any integer greater than or equal to one. N may be any integer greater than or equal to one. The privacy modulation coding scheme F( ) in this situation may be configured as follows.

The M different TX devices may convey signals between themselves to coordinate the coding scheme. The M TX devices may determine a spatial degree of freedom f-by-f=min{M,N}. The TX devices may select the TX side of the modulation order as $$D = 2 \frac{\sum_{n=1}^{N} \log(O_n)}{f}$$

for every one of the M TX devices, where $O_n$ is the requested modulation order for RX device n. The TX devices may define the constellation alphabets on a three-dimensional domain, denoted as $C_{TOTAL}$, where the three dimensional domain has f layers and each layer has D two-dimensional alphabets.

The TX devices may apply N grouping functions $\{F_n\}_{n=1}^N$ to $C_{TOTAL}$ which has f×D alphabets. Each grouping function, for instance $F_n$, will generate a dictionary $C_n$, where each $C_n$ has $O_n$ items and each item has (f×D)/$O_n$ alphabets. The TX devices may modulate symbol $x_n$ for each RX device by modulating symbol $x_n$ on a selected item from $C_n$, producing $C_n(x_n)$. The TX devices may jointly transmit $\cap_{n=1}^N C_n x_n$ to all of the RX devices to accomplish the modulation coding $F(x_1, x_2, \ldots, x_N)$. Note that $\cap_{n=1}^N C_n x_x$ will exactly result in f entries from $C_{TOTAL}$, which will be transmitted as f transmission layers from M TX devices.

Figure 7:
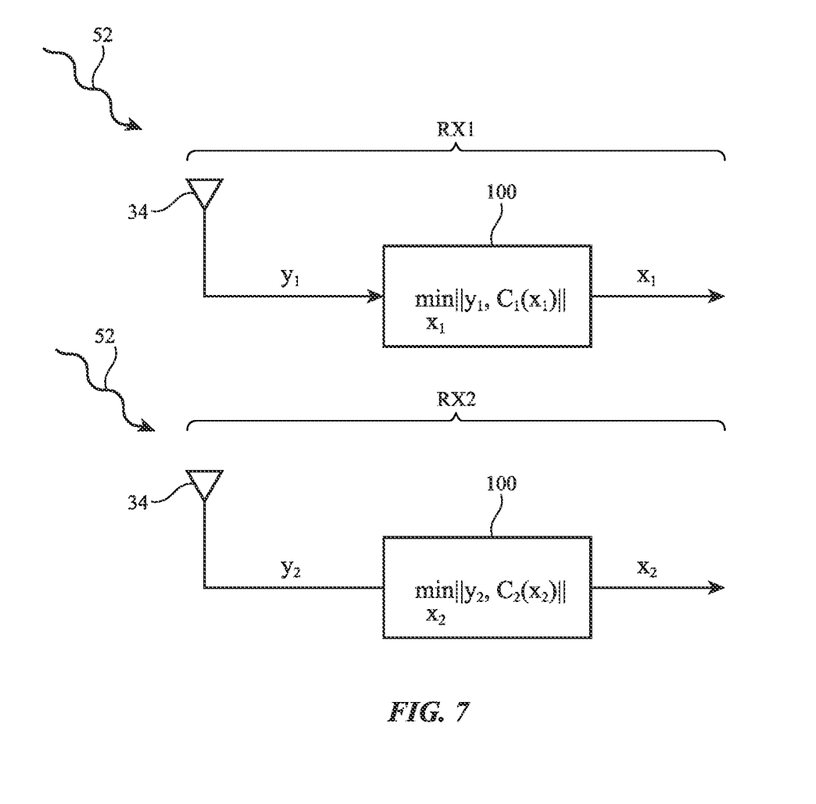
FIG. 7 is a diagram showing how illustrative first and second receiving devices may decode wireless data coded using a privacy-protecting coding scheme of the type illustrated in FIGS. 2-6 in accordance with some embodiments.

FIG. 7 is a diagram showing how device RX1 and device RX2 may decode (demodulate) respective symbols $x_1$ and $x_2$ from the single symbol $F(x_1,x_2)$ transmitted by TX device 10A using a single transmission RE (e.g., at operation 70 of FIG. 3). As shown in FIG. 7, radio-frequency signals 52 may be incident upon the antenna(s) 34 of devices RX1 and RX2. The antenna(s) 34 in device RX1 may pass a received symbol $y_1$ from radio-frequency signals 52 to decoder (demodulator) 100 in device RX1. The antenna(s) 34 in device RX2 may pass a received symbol $y_2$ from radio-frequency signals 52 to decoder (demodulator) 100 in device RX2.

The decoder 100 on device RX1 may decode received symbol $y_1$ to recover the intended symbol $x_1$ transmitted by TX device 10A for device RX1. The decoder 100 on device RX2 may decode received symbol $y_2$ to recover the intended symbol $x_2$ transmitted by TX device 10A for device RX2. The decoder 100 on device RX1 may decode received symbol $y_1$ by solving $\min\|y_1, C_1(x_1)\|$, where $\|.,.\|$ is a distance calculation metric operator that produces a distance metric value characterizing the distance between its arguments (e.g., in the constellation diagram). Similarly, the decoder 100 on device RX2 may decode received symbol $y_2$ by solving $\min\|y_2, C_2(x_2)\|$. The privacy modulation coding scheme implemented by TX device 10A completely protects the privacy of device RX1 from device RX2 and vice versa. This is because device RX1 only requires its own decoding codebook $C_n$ (e.g., codebook CODEBOOKA for device RX1 and codebook CODEBOOKB for device RX2). The codebook only has $O_n$ items, which only carries $O_n$ category of information. Each RX device is unaware of the codebook of the other RX devices. The example of FIG. 7 is illustrative and may, if desired, be generalized to N different RX devices.

Figure 8:
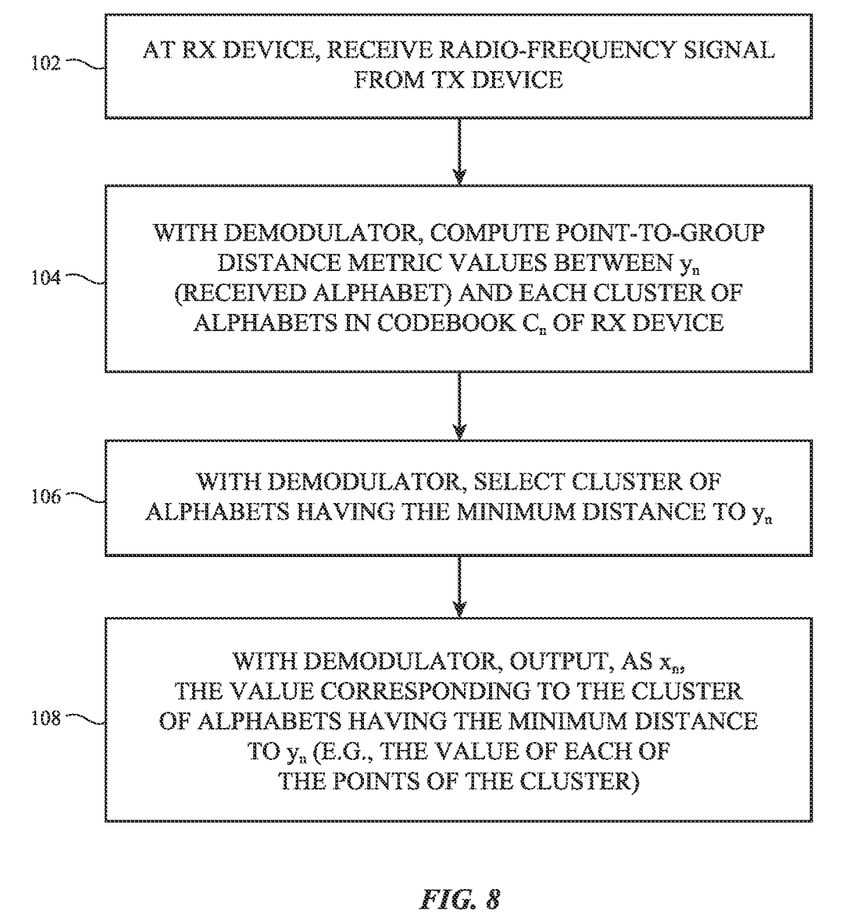
FIG. 8 is a flow chart of illustrative operations that may be performed by a receiving device to decode wireless data coded using a privacy-protecting coding scheme of the type illustrated in FIGS. 2-6 in accordance with some embodiments.

FIG. 8 is a flow chart of operations that may be performed by a given RX device to decode a symbol $x_n$ intended for reception by that RX device and transmitted by TX device 10A in radio-frequency signals 52 (e.g., using privacy modulation coding scheme F( )). The operations of FIG. 8 may, for example, be performed after operation 70 of FIG. 3.

At operation 102, the RX device may receive radio-frequency signals 52 from TX device 10A. The radio-frequency signals may include a symbol $F(x_1, x_2)$ (e.g., as generated during the operations of FIG. 3). The decoder 100 on the RX device may receive a candidate symbol $y_n$ (e.g., a received alphabet) in radio-frequency signals 52.

At operation 104, the decoder (demodulator) 100 on the RX device may compute distance metric values between candidate symbol $y_n$ and different points on its constellation diagram. Rather than generating distance metric values between candidate symbol $y_n$ and each point on the constellation diagram for the RX device (e.g., as given by dictionary $C_n$), decoder 100 may generate distance metric values between the received candidate symbol $y_n$ and each cluster of points (alphabets) in its dictionary (codebook) $C_n$. Each cluster of points may include two or more adjacent/neighboring points (alphabets) 84 on the constellation diagram that represent the same dictionary item in dictionary $C_n$.

For example, when the RX device has a dictionary $C_n$ given by dictionary $C_1$ of FIG. 4 (constellation diagram 80), decoder 100 may generate a distance metric value between candidate symbol $y_n$ and each item (set) 86 in constellation diagram 80. Decoder 100 may, for example, generate the distance metric values by solving $\|y_n, clust_i\|$ for each cluster $clust_i$ in dictionary $C_n$ (e.g., the distance metric values may be between candidate symbol $y_n$ and any point 84 in each of the 16 items 86 of dictionary $C_1$ in FIG. 4 or any portion of the constellation diagram overlapping the items). The distance metric values may be distances in the constellation diagram or any other desired distance metric. In this way, the distance metric values may be point-to-cluster or point-to-group distance metric values (e.g., from the point characterizing the received candidate symbol $y_n$ to the cluster, group, or item 86 of points 84 in dictionary $C_1$) rather than point-to-point distances.

At operation 106, the decoder 100 on the RX device may select the cluster, group, or item 86 of points 84 having the minimum or smallest point-to-cluster distance metric value from the generated point-to-cluster distance metric values (e.g., as calculated at operation 104).

At operation 108, the decoder 100 on the RX device may use the selected cluster, group, or item 86 of points having the minimum point-to-cluster distance to decode (demodulate) candidate symbol $y_n$, recovering the intended symbol $x_n$ for the RX device (e.g., without exposing the RX device to the data from any other RX devices). Decoder 100 may, for example, output symbol $x_n$ as the information value associated with the selected cluster, group, or item 86 (e.g., where all points 84 of that cluster or item 86 are associated with the same information value). For instance, in the example of FIG. 4, if candidate symbol $y_n$ is closer to item 86' (e.g., the region of the constellation diagram spanned by the points in item 86') than any other item 86 in dictionary $C_1$ (or otherwise exhibits a smaller distance metric value to item 86' than any other item 86), decoder 100 may output the information (data) value represented by each point 84 in item 86' as the decoded symbol $x_n$.

In this way, the privacy modulation coding scheme implemented by TX device 10A may offer complete privacy protection at the decoding process for any RX device in any multi-user communication scenario. Multi-user rate splitting can be achieved without using power allocation or frequency/time resource allocation at the TX side. This scheme may avoid the need for SIC receiver structures at each RX device. The RX detection may rely on measuring the distance between the received symbol and groups of alphabets corresponding to each item in the modulation codebook. The TX device may adjust the modulation codebooks based on SNR reports from the RX devices to further optimize performance.

Devices 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-8 may be performed by the components of devices 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 14 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 16 of FIG. 1, etc.). The processing circuitry may include microprocessors, central processing units (CPUs), application-specific integrated circuits with processing circuitry, or other processing circuitry.

For one or more aspects, at least one of the components set forth in one or more of the preceding figures may be configured to perform one or more operations, techniques, processes, or methods as set forth in the example section below. For example, circuitry associated with an electronic device, one or more processors, etc. as described above in connection with one or more of the preceding figures may be configured to operate in accordance with one or more of the examples set forth below.

In some examples, an apparatus may be provided comprising means to perform one or more elements of a method or process described herein.

In some examples, one or more non-transitory computer-readable media may be provided comprising instructions to cause an electronic device, upon execution of the instructions by one or more processors of the electronic device, to perform one or more elements of a method or process described herein.

In some examples, an apparatus may be provided comprising logic, modules, or circuitry to perform one or more elements of a method or process described herein.

In some examples, a method, technique, or process as described in or related to any examples described herein may be provided.

In some examples, an apparatus may be provided comprising: one or more processors and one or more non-transitory computer-readable storage media comprising instructions that, when executed by the one or more processors, cause the one or more processors to perform the method, techniques, or process as described in or related to any examples described herein.

In some examples, a signal may be provided as described in or related to any examples described herein.

In some examples, a datagram, information element, packet, frame, segment, PDU, or message may be provided as described in or related to any examples described in the present disclosure.

In some examples, a signal encoded with data may be provided as described in or related to any examples described in the present disclosure.

In some examples, a signal encoded with a datagram, IE, packet, frame, segment, PDU, or message may be provided as described in or related to any examples as described in the present disclosure.

In some examples, an electromagnetic signal carrying computer-readable instructions may be provided, wherein execution of the computer-readable instructions by one or more processors is to cause the one or more processors to perform the method, techniques, or process as described in or related to any examples described herein.

In some examples, a computer program may be provided comprising instructions, wherein execution of the program by a processing element is to cause the processing element to carry out the method, techniques, or process as described in or related to any examples described herein.

In some examples, a signal in a wireless network as shown and described herein may be provided.

In some examples, a method of communicating in a wireless network as shown and described herein may be provided.

In some examples, a system for providing wireless communication as shown and described herein may be provided.

In some examples, a device for providing wireless communication as shown and described herein may be provided.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed.

What is claimed is:

1. A method of operating a first electronic device to transmit a first data symbol to a second electronic device, the method comprising:
   with one or more processors, generating, based on a transmit modulation constellation, a dictionary having a set of items, each item in the set of items corresponding to a different respective information value for the data first symbol and each item in the set of items including multiple points from the transmit modulation constellation;
   with the one or more processors, generating modulated data by modulating the first data symbol onto a point from an item in the dictionary;
   with the one or more processors, generating a second data symbol based on the modulated data; and
   with one or more antennas, transmitting a radio-frequency signal that includes the second data symbol.

2. The method of claim 1, wherein generating the second data symbol comprises generating the second data symbol based on an intersection of the modulated data with additional modulated data associated with an additional dictionary.

3. The method of claim 1, wherein the second electronic device has a first modulation order, the transmit modulation constellation has a second modulation order, the set of items includes a number of items equal to the first modulation order, and the multiple points in each item in the set of items including a number of points equal to the first modulation order.

4. The method of claim 1, wherein generating the dictionary comprises generating the dictionary based on a radio-frequency channel state of the second electronic device.

5. The method of claim 4, wherein generating the dictionary comprises generating the dictionary based on a signal-to-noise ratio (SNR) of the second electronic device.

6. The method of claim 5, wherein generating the dictionary comprises grouping the multiple points in the items of the set of items into radial clusters when the SNR exceeds a threshold value.

7. The method of claim 6, wherein generating the dictionary comprises grouping the multiple points in the items of the set of items in azimuthal clusters when the SNR is less than the threshold value.

8. The method of claim 4, further comprising:
with the one or more antennas, receiving a channel state report from the second electronic device that identifies the radio-frequency channel state of the second electronic device.

9. A method of using a first electronic device to transmit a first data symbol to a second electronic device and a second data symbol to a third electronic device, the method comprising:
with one or more processors, generating, based on a transmit modulation constellation, a first dictionary associated with the second electronic device;
with the one or more processors, generating, based on the transmit modulation constellation, a second dictionary associated with the third electronic device;
with the one or more processors, generating first modulated data by modulating the first data symbol onto a first entry from the first dictionary;
with the one or more processors, generating second modulated data by modulating the second data symbol onto a second entry from the second dictionary;
with the one or more processors, generating a third data symbol based on the first modulated data and the second modulated data; and
with one or more antennas, transmitting a radio-frequency signal that includes the third data symbol.

10. The method of claim 9, wherein generating the third data symbol comprises generating the third data symbol based on an intersection of the first modulated data with the second modulated data.

11. The method of claim 9, wherein transmitting the radio-frequency signal comprises transmitting the third data symbol within a single transmit resource element (RE).

12. The method of claim 9, wherein the second electronic device has a first modulation order, the third electronic device has a second modulation order, the transmit modulation constellation has a third modulation order, the first dictionary has a number of items equal to the first modulation order, and the second dictionary has a number of items equal to the second modulation order.

13. The method of claim 9, wherein generating the first dictionary comprises applying a first grouping function to the transmit modulation constellation.

14. The method of claim 13, wherein generating the second dictionary comprises applying a second grouping function to the transmit modulation constellation.

15. The method of claim 14, wherein the first dictionary has a first set of items each corresponding to a different respective information value, the second dictionary has a second set of items each corresponding to a different respective information value, each of the items in the first set of items includes a respective set of entries each corresponding to a same information value, and each of the items in the second set of items includes a respective set of entries each corresponding to an additional same information value.

16. The method of claim 15, wherein the first grouping function groups the entries from the first set of items into at least a first cluster and a second cluster, the first cluster includes neighboring entries from a first item in the first set of items, the neighboring entries of the first cluster correspond to a first information value, the second cluster includes neighboring entries from a second item in the first set of items, the neighboring entries of the second cluster correspond to a second information value, the second dictionary includes no more than one entry corresponding to the first information value within a region of the transmit modulation constellation overlapping the first cluster, and the second dictionary includes no more than one entry corresponding to the second information value within a region of the transmit modulation constellation overlapping the second cluster.

17. The method of claim 16, wherein the second grouping function groups the entries from the second set of items into at least a third cluster and a fourth cluster, the third cluster includes neighboring entries from a third item in the second set of items, the neighboring entries of the third cluster correspond to a third information value, the fourth cluster includes neighboring entries from a fourth item in the second set of items, the neighboring entries of the fourth cluster correspond to a fourth information value, and the first and second clusters are larger than the third and fourth clusters.

18. An electronic device comprising:
storage that stores a demodulation codebook;
one or more antennas configured to receive a radio-frequency signal having a candidate symbol; and
a decoder configured to
compute point-to-group distance metric values between the candidate symbol and a set of clusters of alphabets identified by the demodulation codebook, and
output a decoded symbol corresponding to a cluster from the set of clusters having a minimum point-to-group distance metric value.

19. The electronic device of claim 18, wherein each cluster in the set of clusters overlaps multiple points on a transmit modulation constellation used to transmit the radio-frequency signal.

20. The electronic device of claim 18, further comprising:
radio-frequency transceiver circuitry configured to generate a baseband signal based on the radio-frequency signal; and
baseband circuitry configured to receive the baseband signal from the radio-frequency transceiver circuitry, the baseband circuitry including the decoder.

* * * * *

UNITED STATES PATENT AND TRADEMARK OFFICE
CERTIFICATE OF CORRECTION

PATENT NO. : 12,068,894 B2
APPLICATION NO. : 17/944947
DATED : August 20, 2024
INVENTOR(S) : Zhou Zhou and Sharad Sambhwani Page 1 of 1

It is certified that error appears in the above-identified patent and that said Letters Patent is hereby corrected as shown below:

In the Claims

Column 18, Line 35, "data first" should read -- first data --

Signed and Sealed this
Nineteenth Day of August, 2025

Coke Morgan Stewart
*Acting Director of the United States Patent and Trademark Office*